(12) United States Patent
Padrinao et al.

(10) Patent No.: US 6,422,229 B1
(45) Date of Patent: Jul. 23, 2002

(54) SAW BLADE FOR CUTTING INTEGRATED CIRCUIT PACKAGE BOARDS

(75) Inventors: Edgardo Padrinao, Milpitas, CA (US); Adi Anuar Basarudin, Penang (MY)

(73) Assignee: Advanced Micro Devices, Inc., Sunnyvale, CA (US)

( * ) Notice: Subject to any disclaimer, the term of this patent is extended or adjusted under 35 U.S.C. 154(b) by 6 days.

(21) Appl. No.: 09/605,856

(22) Filed: Jun. 29, 2000

(51) Int. Cl.[7] .................................. B26D 3/00
(52) U.S. Cl. .................. 125/25; 125/18; 125/13.01; 83/835
(58) Field of Search ............... 125/15, 18, 12, 125/13.01, 22; 83/835, 851, 929.1

(56) References Cited

U.S. PATENT DOCUMENTS

| | | | |
|---|---|---|---|
| 3,203,140 A | * 8/1965 | Hallez | 125/15 |
| 3,291,583 A | * 12/1966 | Lindblad | 125/15 |
| 4,291,667 A | * 9/1981 | Eichenlaub et al. | 125/15 |
| 4,769,108 A | * 9/1988 | Deppe et al. | 156/631 |
| 4,854,295 A | 8/1989 | Sakarcan | |
| 5,018,276 A | 5/1991 | Asada | |
| 5,272,114 A | * 12/1993 | Van Berkum et al. | 437/226 |
| 5,839,423 A | * 11/1998 | Jones et al. | 125/15 |
| 6,304,792 B1 | * 10/2001 | Mahanpour | 700/121 |

FOREIGN PATENT DOCUMENTS

| | | |
|---|---|---|
| BE | 705527 | 3/1968 |
| EP | 0043136 | 6/1981 |
| EP | 10058329 | 3/1998 |
| WO | PCT/US01/18407 | 12/2001 |

* cited by examiner

Primary Examiner—George Nguyen

(57) ABSTRACT

A device for cutting integrated circuit package boards is disclosed. The device includes a circular saw blade. A plurality of slots are cut in the circumference of the circular saw blade, at least some of the plurality of slots having a depth of at least approximately 2 mm. The blade may have a plurality of first and second slots of different depths cut in the circumference of the saw blade arranged in an alternating pattern.

9 Claims, 2 Drawing Sheets

SAW BLADE FOR CUTTING INTEGRATED CIRCUIT PACKAGE BOARDS

FIELD OF THE INVENTION

The present invention relates to devices for cutting integrated circuit package boards and, more particularly, to saw blades for cutting integrated circuit packages.

DESCRIPTION OF RELATED ART

One known type of saw blade used to cut integrated circuit package boards is shown in FIG. 1, in which there is shown a circular saw blade 10. The saw blade 10 is a solid piece construction having no slots or teeth. The blade 10 has a mounting portion 12 at its center for mounting the blade 10 to the cutting machine. The blade is nickel-plated.

There are many problems associated with nickel-plated saw blades. For instance, because of the very hard nature of the electroplated nickel binder, loading of the saw blade occurs frequently when cutting package boards and unacceptable package chipping is observed. Loading results when fragments of the package board that chip during cutting stick in the surface of the saw blade, thereby changing the shape or contour of the blade. There are several effects associated with loading, including vibration of the saw blade, chipping of the package material, and a current surge on the spindle of the cutting machine.

In addition, when loading occurs, the "loading" must be removed from the blade. To do so, the saw process must be stopped and the blade be "dressed" using a special board designed for such an application. Such measures greatly reduce the efficiency of the operation.

One solution has already been proposed as shown in FIG. 2, which provides a hard metal saw blade 20 having slots 22 cut about the circumference of the saw blade 20. The blade 20 has a mounting portion 24 for mounting the saw blade 20 to the cutting machine. The depth "d" of each slot is 1 mm. This prior art saw blade 20 alleviates many of the problems associated with the nickel-plated saw blade of FIG. 1. On the other hand, the saw blade 20 of FIG. 2 has problems in that the blade 20 wears very quickly, particularly those portions of the blade 20 between the slots 22. This has the effect of eliminating the slots 22 and reducing the life of the blade 20.

SUMMARY OF THE INVENTION

There is a need for a saw blade for cutting integrated circuit package boards that has a longer life and avoids chipping the board.

These and other needs are met by an embodiment of the present invention, which provides a device for cutting integrated circuit package boards comprising a circular saw blade and a plurality of slots cut in the circumference of the circular saw blade, the plurality of slots having a depth of at least approximately 2 mm.

The above needs and others are also met by another embodiment of the invention, which provides a device for cutting integrated circuit package boards comprising a circular saw blade and a plurality of first and second slots cut in the circumference of the saw blade. The first and second slots are arranged in an alternating pattern and at least one of the plurality of first and second slots has a depth of at least approximately 2 mm.

The saw blade according to the invention prolongs the life of the saw blade, eliminates loading during cutting of the integrated circuit package boards, reduces the occurrence of current surges on the spindle of the saw mechanism, and reduces chipping of the integrated circuit boards that occurs during sawing.

Additional advantages and novel features of the invention will be set forth in part in the following description and, in part, will become apparent to those skilled in the art from an examination of the following description or from practicing the invention.

BRIEF DESCRIPTION OF THE DRAWINGS

Preferred embodiments of the invention will be described with reference to the drawings, which are incorporated in and constitute a part of the specification, in which.

DETAILED DESCRIPTION OF THE PREFERRED EMBODIMENTS

Figure 3:
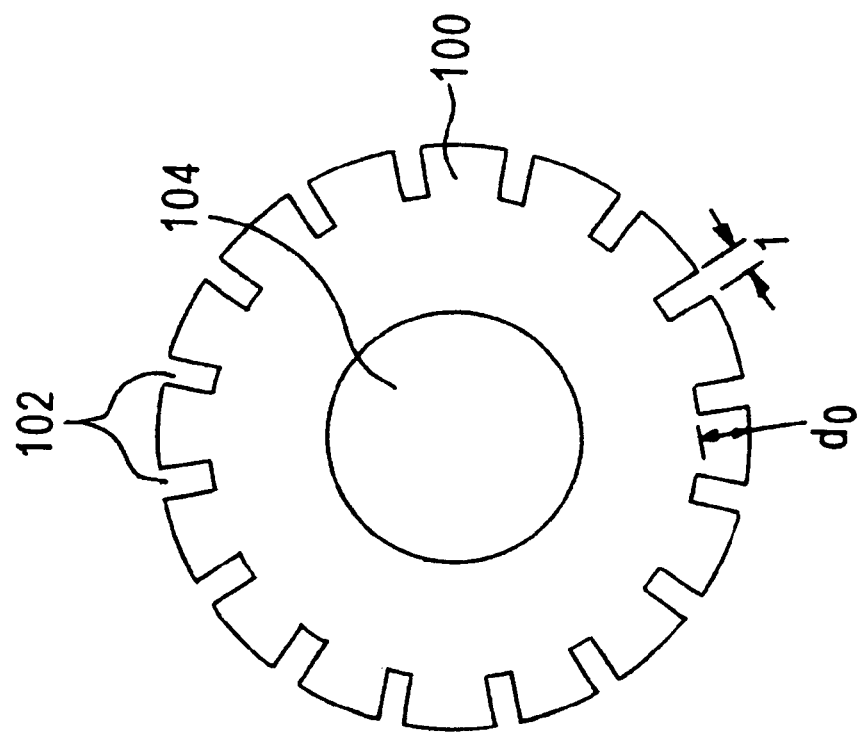
FIG. 3 is a side view of a saw blade according to an embodiment of the invention.

Referring now to the drawings, and initially to FIG. 3, there will be seen an embodiment of a saw blade 100 according to the invention. As shown, the saw blade 100 is circular in shape and has a plurality of slots 102 cut in the circumference of the blade 100. The blade 100 also has a mounting portion 104 for mounting the blade 100 to the cutting machine. The mounting portion 104 shown is a hole, but can be any assembly that allows for the blade 100 to be mounted to the cutting machine.

The depth "d" of each slot 102 is at least 2 mm and width "w" of each slot is approximately 0.5 mm. The diameter of the saw blade 100 could range from 55 mm to 88 mm. The ratio of depth to width is approximately 3 to 1 (actual is between 2:1 and 4:1). Also, the ratio of the diameter of the saw blade to the depth of the slots is approximately 35 to 1 (actual is between 28:1 and 50:1). The depth $d_0$ of each slot 102 is at least 2 mm.

Figure 2:
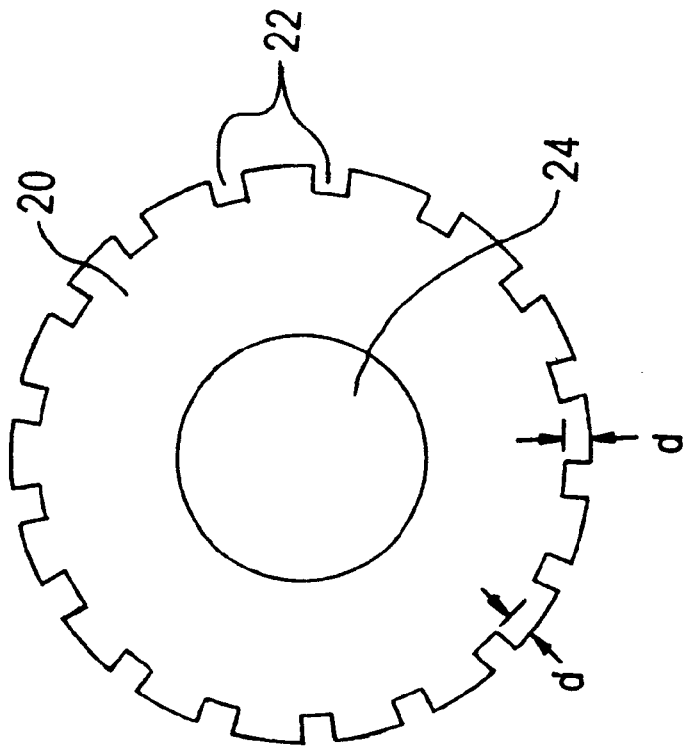
FIG. 2 is a side view of another conventional saw blade.
Figure 1:
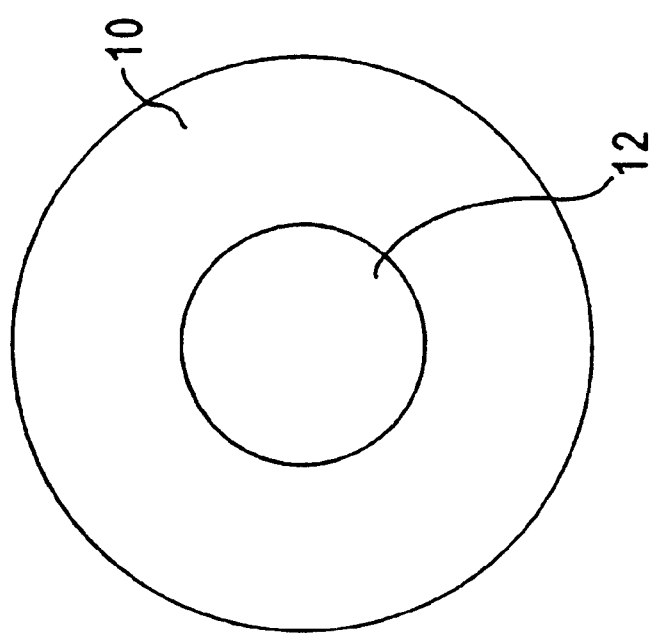
FIG. 1 is a side of view of a conventional saw blade.

The increased slot depth as compared to the prior art saw blade of FIG. 2 results in an increase in the life of the saw blade 100, because it takes longer to wear down the blade to such an extend that the slots 102 disappear. Moreover, the slots 102 provide for increased cooling efficiency because there is more surface area within the slots to cool the saw blade 100. The saw blade 100 is made from a hard metal binder material.

Typically, integrated circuit packages are about two-thirds molding compound and one-third organic material. The blade penetrates approximately 0.2 mm when cutting and the table moves at about 4 inches per second. The blade rotates at about 30,000 to 40,000 revolutions per minute and water is used to cool the blade.

One difficulty with increasing slot depths arises because of the nature of the saw blade used to cut the package boards. For instance, the thickness of the saw blade is approximately ?? 350 microns, with an accuracy of +/-3 microns, whereas the tolerance of the package being cut is only +/- 5 microns. Thus, it is very important that a stable blade be used because there is extremely little margin for error. Due to the very small thickness of the blade, however, certain slot depths may result in the blade being weakened to the point of breakage.

In applications where breakage becomes a problem, another embodiment of the saw blade provides a circular saw blade 200 having first slots 202 and second slots 204. The blade 200 also has a mounting portion 206 for mounting the blade 200 to a cutting machine. Preferably, the first and second slots 202, 204 alternate about the circumference of the saw blade 200. The first slots 202 have a depth $d_2$ smaller than 2 mm (e.g., 1 mm), whereas the second slots 204 have a depth $d_1$, that is at least approximately 2 mm. Preferably, the ratio of the depth of the second slots to the first slots is 2 to 1. Preferably, the widths "w" of the first and second slots are the same.

Figure 4:
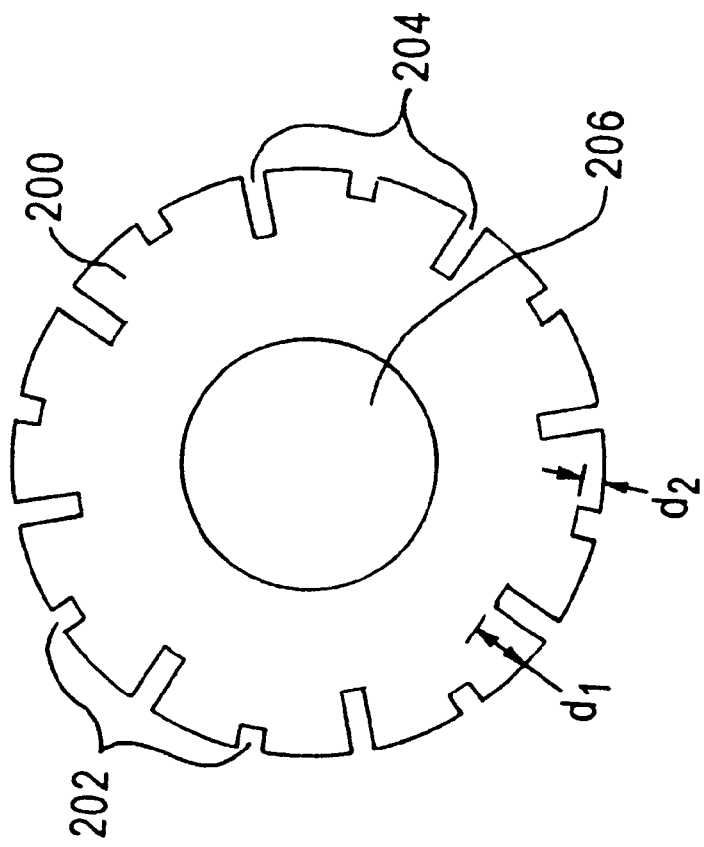
FIG. 4 is a side view of a saw blade according to another embodiment of the invention.

The embodiment of FIG. 4 provides greater stability throughout the blade 200 because only some of the slot depths, those of the second slots 204, are increased. The life of the blade 200 is still increased as compared to the prior art, because once the blade has been worn such that the smaller first slots 202 no longer exist, there are still a plurality of second slots 204 that allow for continued use of the blade. The other specifications of the first embodiment preferably are the same in the second embodiment.

The saw blade according to the invention prolongs the life of the saw blade, eliminates loading during cutting of the integrated circuit package boards, reduces the occurrence of current surges on the spindle of the saw mechanism, and reduces chipping of the integrated circuit boards that occurs during sawing.

While this invention has been described in connection with what is presently considered to be the most practical and preferred embodiments, it is to be understood that the invention is not limited to the disclosed embodiments, but, on the contrary, is limited to cover various modifications and equivalent arrangements within the scope of the appended claims.

What is claimed is:

1. A device for cutting integrated circuit package boards comprising:

a saw blade; and a plurality of first and second slots cut in the circumference of the saw blade, the first and second slots arranged in an alternating pattern, wherein the first slots have a first depth and the second slots have a second depth greater than the first depth;

wherein the first depth is less than approximately 2 mm; and the second depth is approximately 2 mm.

2. A device as claimed in claim 1, wherein the first depth is approximately 1 mm.

3. A device as claimed in claim 1, further comprising a mounting portion in the center of the saw blade for mounting the blade to a cutting machine.

4. The device as claimed in claim 1, wherein the saw blade comprises metal bonded diamond grits.

5. The device as claimed in claim 1, wherein a ratio of the depth of each slot to the width of each slot is 3 to 1.

6. The device as claimed in claim 1, wherein a ratio of the depth of each second slot to the diameter of the blade is 1 to 25.

7. The device as claimed in claim 1, wherein the second depth is twice as large as the first depth.

8. The device as claimed in claim 1, wherein the first and second slots have identical widths.

9. The device as claimed in claim 1, wherein the saw blade is configured to wear down between the slots while still allowing continued use of the saw blade.

* * * * *